United States Patent [19]

Kuxdorf et al.

[11] Patent Number: 4,603,039
[45] Date of Patent: Jul. 29, 1986

[54] PROCESS FOR MAKING PHOSPHORUS PENTOXIDE AND OPTIONALLY PHOSPHORIC ACID WITH UTILIZATION OF THE REACTION HEAT

[75] Inventors: Bernhard Kuxdorf, Brühl; Peter Luhr, Bad Münstereifel; Ursus Thümmler, Erftstadt; Hugo Werner, Hürth; Walter Klemm, Rippenweier, all of Fed. Rep. of Germany

[73] Assignee: Hoechst Aktiengesellschaft, Fed. Rep. of Germany

[21] Appl. No.: 741,482

[22] Filed: Jun. 5, 1985

Related U.S. Application Data

[63] Continuation of Ser. No. 601,026, Apr. 16, 1984, abandoned.

[30] Foreign Application Priority Data

May 13, 1983 [DE] Fed. Rep. of Germany ....... 3317497

[51] Int. Cl.$^4$ ............................................ C01B 25/12
[52] U.S. Cl. .................................... 423/304; 422/188; 422/200; 422/202; 423/317
[58] Field of Search ................................ 423/304, 317

[56] References Cited

U.S. PATENT DOCUMENTS 4,379,131 4/1983 Daniel et al. ......................... 423/304

OTHER PUBLICATIONS

VDI Wärmeatlas, 4th Edition, 1984, p. Dd 1, "Application limits of heat carriers".
Technik-Lexikon, 1972, pp. 569 and 570.
Kirk-Othmer, Encyclopedia of Chemical Technology, Third Ed., vol. 21, John Wiley & Sons (1983), pp. 507, 508, 542.

Primary Examiner—John Doll
Assistant Examiner—Wayne A. Langel
Attorney, Agent, or Firm—Connolly and Hutz

[57] ABSTRACT

The disclosure relates to a process for making phosphorus pentoxide by subjecting elemental yellow phosphorus to combustion with dried air inside a steel-made combustion chamber with utilization of the reaction heat for the production of energy. To this end, the disclosure provides for the combustion to be effected inside a combustion chamber of which the walls are arranged so as to form a cooling system with cavities therein; for water or a water/steam-mixture as a heat carrier abstracting the reaction heat to be circulated through the cooling system, the water or water/steam-mixture assuming an increased temperature being circulated, preferably under increased pressure; for steam formed in the cooling system to be continuously taken therefrom; for an equivalent proportion of fresh desalted water to be introduced into the cooling system; for hot gaseous phosphorus pentoxide issuing from the combustion chamber to be condensed or worked up into phosphoric acid; for the steam taken from the cooling system to be passed through a steam delivery pipe disposed in the upper portion of the combustion chamber, or through a delivery conduit for product gas containing phosphorus pentoxide; for the steam to be heated therein to a temperature of 400° to 600° C. under constant pressure, and for the steam so superheated to be used.

10 Claims, 1 Drawing Figure

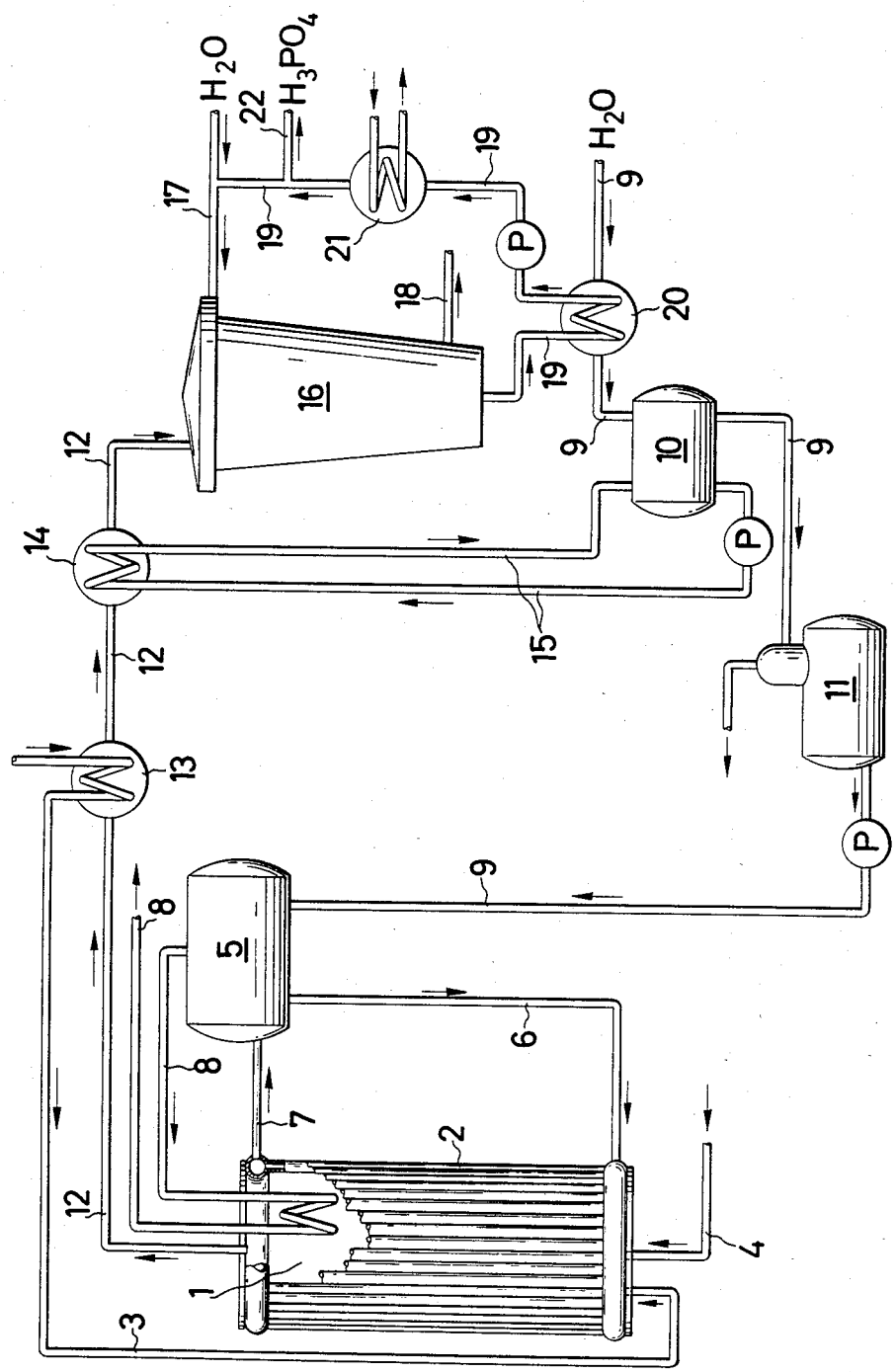

PROCESS FOR MAKING PHOSPHORUS PENTOXIDE AND OPTIONALLY PHOSPHORIC ACID WITH UTILIZATION OF THE REACTION HEAT

This application is a continuation of application Ser. No. 601,026 filed Apr. 16, 1984, abandoned.

U.S. Pat. No. 4 379 131 describes a process for making phosphorus pentoxide by subjecting elemental phosphorus to a combustion reaction with the aid of air while utilizing the reaction heat for the production of energy wherein the phosphorus is subjected to combustion with dried air containing, per m$^3$, 5 to 0.01 g water inside a combustion chamber of which the metallic walls are arranged so as to form a cooling system with cavities therein; a liquid or liquid/steam-mixture as a heat carrier for the reaction heat is circulated through the cooling system under a pressure of 1 to 150 bars, the liquid or liquid/steam mixture assuming a temperature of more than 150° up to 500° C.; steam which is being formed in the cooling system is continuously taken therefrom and replaced by an equivalent proportion of fresh liquid; and hot P$_2$O$_5$ issuing in vapor form from the combustion chamber is condensed or worked up into desirable final product. Water is the liquid which is preferably circulated. The walls forming the cooling system of the combustion chamber are made of stainless steel, for example, and are especially comprised of a plurality of metallic tubular structures directly welded together, of finned tubes or membrane tubes, the individual tubes being disposed vertically or horizontally. Phosphorus pentoxide issues in vapor form from the combustion chamber at a temperature of 300° to 1000° C. and is worked up into phosphoric acid, for example.

Canadian Pat. No. 1 139 099 discloses a process for recovering heat originating from the combustion of elemental phosphorus in the presence of water, and for making ultraphosphoric acid. More specifically, a product stream containing P$_2$O$_5$ is contacted with a metal cooling coil containing a heat transfer fluid maintaining the surface of the cooling coil at a temperature of 100° to 900° C.

Japanese Patent Specification JP-OS 54-84 890 (Application No. 77/153 343) describes an apparatus comprising a combustion furnace inside which liquid phosphorus is burnt with dry air to give phosphorus pentoxide, temperatures of up to 2000° C. being produced therein. The furnace wall is surrounded by a cooling system comprised of tubular structures, permitting the reaction product to be cooled to 800° to 1000° C. As shown in FIG. 2 of the above JP-OS, a cooling agent is circulated (in a cycle comprised of elements 11, 10, 9, 8, 9, 15, 12) through the furnace wall, a separator (12) being installed in this cycle. A second parallel cooling medium cycle (comprised of elements 10, 9, 17, 9, 15, 12) permits the upper narrowed portion of the combustion furnace (7) to be additionally cooled.

German Patent Application DE-P No. 33 15 630.1 filed earlier but not yet published finally describes a process and apparatus for making phosphorus pentoxide while utilizing the reaction heat inside a combustion chamber which is a cylindrical vessel presenting a height/diameter-ratio of 2.5:1 up to 5:1 and having 1 to 10 burners disposed axisymmetrically in its circular base plate. This permits the heat transferring surfaces to be kept free from depositing material or they become just slightly but regularly covered therewith. As disclosed in the working Example of that Specification, 65% of the reaction heat set free during the combustion is transmitted through the steel tube wall to water which is used as a heat carrier and is partially evaporated thereby.

The process of this invention permits the reaction heat to be even more effectively utilized, especially in those cases in which the phosphorus pentoxide contained in the product gas is directly converted to phosphoric acid.

The present invention relates more particularly to a process for making phosphorus pentoxide by subjecting elemental yellow phosphorus to combustion with dried air inside a steel-made combustion chamber with utilization of the reaction heat for the production of energy, which comprises: effecting the combustion inside a combustion chamber of which the walls are arranged so as to form a cooling system with cavities therein; circulating water or a water/steam-mixture as a heat carrier abstracting the reaction heat through the cooling system, the water or water/steam-mixture assuming an increased temperature being preferably so circulated under increased pressure; continuously taking from the cooling system steam which is being formed therein; introducing an equivalent proportion of fresh desalted water into the cooling system; condensing hot gaseous phosphorus pentoxide issuing from the combustion chamber or working up said gaseous phosphorus pentoxide into more concentrated phosphoric acid while adding water or phosphoric acid thereto; flowing the steam taken from the cooling system through a steam delivery pipe disposed in the upper portion of the combustion chamber, or flowing it through the delivery conduit for hot gaseous P$_2$O$_5$; heating the steam therein to a temperature of 400° to 600° C. under constant pressure, and ultimately using the steam so superheated.

Further preferred and optional features of this invention provide:

(a) for the hot gaseous phosphorus pentoxide issuing from the combustion chamber with a temperature of 500° to 1000° C. to be used for preheating, in heat exchange, to 70° to 300° C. the dried air necessary for the combustion of the phosphorus;

(b) for the hot gaseous phosphorus pentoxide issuing from the combustion chamber with a temperature of 500° to 1000° C. to be used for preheating, in heat exchange, the cooling water circulated through the cooling system of the combustion chamber, the cooling water being preheated to 50° to 200° C. outside the cooling water cycle;

(c) for the hot phosphoric acid obtained upon quenching the issuing gaseous phosphorus pentoxide with phosphoric acid to be used for preheating, in heat exchange, fully desalted fresh water to 40° to 80° C., the cooling water so preheated being circulated through the cooling system of the combustion chamber;

(d) for the phosphorus to be subjected to combustion under a pressure of 0.8 to 10 bars;

(e) for water or a water/steam mixture as the heat carrier abstracting the reaction heat to be circulated through the cooling system while assuming a temperature of 100° to 370° C. under a pressure of 1 to 200 bars;

(f) for the agent used as the heat carrier and for the production of steam to be fully desalted, degassed water containing 0.01 to 0.1 mg/l oxygen and 0.01 to 0.5 mg/l chloride;

(g) for the walls of the combustion chamber arranged to form a cooling system to be comprised of a plurality of vertically disposed tubular structures which are welded together.

The process of this invention will now be described with reference to the accompanying flow scheme.

Cylindrical combustion chamber (1) preferably presents a height/diameter-ratio of 2.5:1 up to 5:1. It should conveniently be made of stainless steel and cooling water is passed through its wall (2) comprised of vertically disposed tubular structures which are welded together, of finned tubes or of membrane tubes. Dried air, preheated to 70°–300° C., coming through line (3) is introduced, preferably in a stoichiometric excess proportion of 1–40%, into combustion chamber (1), and liquid yellow phosphorus coming through line (4) is introduced thereinto through the chamber's base plate. Disposed axisymmetrically in the base plate is (are) one or more burner(s) (not shown in the drawing). The pressure prevailing in combustion chamber (1) is 0.8 to 10 bars. The burner(s) is (are) either provided with (a) single medium nozzle(s) through which liquid phosphorus is injected into the combustion chamber under a pressure of 5–50 bars, or with (a) two medium nozzle(s) for the injection of liquid phosphorus and atomizing air, the air being injected into the combustion chamber under a pressure of 2–6 bars. The combustion chamber is conveniently operated under a heating surface load of 50–150 kw/m$^2$ and under a heating volume load of 300–600 kw/m$^3$.

Cooling water is recycled from steam separator (5) through line (6), wall (2) and line (7) back into steam separator (5), the water assuming a temperature of 100° to 370° C. under a pressure of 1–220 bars. Steam (saturated steam) which is freshly formed during each passage through the cycle is removed through line (8) which is passed through the upper portion of combustion chamber (1), the steam assuming a temperature of 400° to 600° C. under constant pressure. The steam so superheated can be used for operating turbines of the kind employed for the generation of current, for example.

Fully desalted fresh water of 50°–200° C. coming from a reservoir (10) is pumped through line (9) into steam separator (5) at the same rate as superheated steam is taken from line (8). The fresh water is passed through vessel (11) in which it is degassed by means of saturated steam. In other words, degassed fresh water is introduced into steam separator (5).

The product gas containing $P_2O_5$, $O_2$ and $N_2$ and having a temperature of 500°–1000° C. issues from combustion chamber (1) through line (12). It is used in heat exchanger (13) for preheating dried air flowing through line (3) into the combustion chamber to 70°–300° C. In heat exchanger (14), the product gas transmits further heat to a separate cooling water cycle (15) which is connected to reservoir (10). In this way, fresh water coming from line (9) is preheated to the temperature necessary for operation of the combustion chamber cycle (5, 6, 2, 7, 5).

The product gases having a temperature of 300°–800° C. are ultimately introduced into an acid tower (16) in which they are quenched with phosphoric acid coming from line (17). Residual gases consisting essentially of nitrogen and oxygen are removed through line (18). More concentrated phosphoric acid formed in acid tower (16) is taken therefrom through line (19) and is indirectly cooled in heat exchanger (20) by contacting it with fresh water coming through line (9). The fresh water so preheated is introduced into reservoir (10), whilst the more concentrated phosphoric acid can be further cooled, if desired, in cooler (21) prior to partially removing it as final product through line (22) or partially recycling it through line (17) to the head of acid tower (16) while diluting it with water.

It is also possible to omit reservoir (10), to preheat the fresh water coming through line (9) in heat exchanger (20) and then directly introduce it through heat exchanger (14) into degassing vessel (11).

EXAMPLE 210 kg per hour elemental yellow liquid phosphorus which had a temperature of 75° C. was subjected to combustion in the presence of dried preheated atomizing air under a pressure of 5 bars inside cylindrical combustion chamber (1) of stainless steel. The height-/diameter-ratio was 4:1.

Just one burner directed upwardly was disposed centrally in the base plate of combustion chamber (1). The burner was provided with a two medium nozzle for injecting phosphorus and atomizing air. The dried air was preheated to 105° C. in heat exchanger (13) installed in product gas line (12) and it was used in a stoichiometric excess of 20%. A pressure of 1.5 bars prevailed in combustion chamber (1).

65% of the reaction heat of 4 gj/h set free during the combustion of the phosphorus was transmitted to the heat carrier which was fully desalted and degassed water (chloride content: 0.05 mg/l; oxygen content: 0.04 mg/l; pH 9) and was circulated through tube wall (2) of combustion chamber (1). As a result, the water was partially evaporated.

The water/steam-mixture ascended through the individual tubular structures forming wall (2) into a collecting tube and then passed through line (7) into steam separator (5) in which steam and liquid were separated from one another.

Saturated steam was removed at a rate of 1.4 tons/h through line (8) and heated to 450° C. by means of $P_2O_5$-containing product gas of 850° C. The steam pressure was maintained at 80 bars.

The liquid phase (295° C.) in steam separator (5) was recycled through recycle line (6) and introduced into tube wall (2). The water cycle effected by density difference in the cycle system was thus closed.

By means of a level control and a pump installed in line (9), it was ensured that the cooling system was always supplied with sufficient water, fresh water coming from reservoir (10). The water was supplied at the rate necessary for compensating the evaporated quantity of 1.4 tons/h.

The fully desalted fresh water (1.4 tons/h) was preheated to 60° C. in heat exchanger (20). By means of a recirculation pump installed in cycle line (15), it was ensured that a second heat exchanger (14) installed in product gas line (12) was continuously supplied with fresh water coming from reservoir (10). In heat exchanger (14), the water was heated up to 75° C.

The cooling water cycle (10, 15, 14) comprised a volume of 2.5 tons water. In vessel (11), the water was degassed by introducing saturated steam thereinto, the cooling water temperature increasing to 102° C. under a pressure of 1.01 bar.

$P_2O_5$-containing product gases which had a temperature of 850° C. were taken from combustion chamber (1). In product gas line (12), they were cooled in contact with steam line (8) and in heat exchangers (13) and (14) to 350° C. prior to entering acid tower (16), whereby about 20% of the reaction heat was recovered.

The conversion of yellow phosphorus was quantitative so that 1025 m³/h product gas (standard conditions) containing 7.4 volume % $P_2O_5$ was introduced into acid tower (16), in which the $P_2O_5$ was quantitatively absorbed at 75° C. in water and circulated 87 mass % phosphoric acid, to give 89 mass % phosphoric acid.

The 89 mass % phosphoric acid coming from acid tower (16) with a temperature of 85° C. transmitted its heat in heat exchanger (20) to the fresh water used in the cooling water cycle of combustion chamber (1), whereby a further 8% of the reaction heat was recovered.

740 kg/h phosphoric acid containing 89 mass % $H_3PO_4$ and having a temperature of 75° C. controlled by means of heat exchanger (21) which was fed with cooling water, was taken from the acid cycle through line (22). This made it necessary for 260 kg/h water coming through line (17) to be freshly introduced into the cycle.

We claim:

1. A process for making phosphorus pentoxide by subjecting elemental yellow phosphorus to combustion with dried air inside a stainless steel-made combustion chamber with utilization of the reaction heat for the production of energy, which comprises: effecting the combustion with the resultant formation of hot gaseous phosphorus pentoxide inside a combustion chamber of which the walls are arranged so as to form a cooling system with cavities therein; circulating water or a water/steam-mixture as a heat carrier abstracting the reaction heat through the cooling system, the water or water/steam-mixture assuming a temperature of 100° to 370° C. under a pressure of 1 to 220 bars; continuously taking from the cooling system steam which is being formed therein; introducing an equivalent proportion of fully desalted fresh water containing 0.01 to 0.1 mg/l oxygen and 0.01 to 0.5 mg/l chloride into the cooling system; using said hot gaseous phosphorus pentoxide issuing from the combustion chamber with a temperature of 500° to 1000° C. for preheating, in heat exchange, to 70° to 300° C. the dried air necessary for the combustion of the phosphorus, furthermore using said hot gaseous phosphorus pentoxide for preheating, in heat exchange, said fully desalted fresh water provided for introducing into the cooling system to 50° to 200° C., and finally condensing said hot gaseous phosphorus pentoxide or working it up into phosphoric acid; flowing the steam taken from the cooling system through a steam delivery pipe having a portion thereof in the form of a heat exchanger arranged in the upper portion of the combustion chamber and therefore being in contact with said hot gaseous phosphorus pentoxide, heating the steam in said heat exchanger to a temperature of 400° to 600° C. under constant pressure with the resultant formation of superheated steam, and ultimately using the steam so superheated.

2. The process as claimed in claim 1, wherein the hot phosphoric acid obtained upon quenching the issuing gaseous phosphorus pentoxide with phosphoric acid is used for preheating, in heat exchange, fully desalted fresh water to 40° to 80° C., the cooling water so preheated being circulated through the cooling system of the combustion chamber.

3. The process as claimed in claim 1, wherein the phophorus is subjected to combustion under a pressure of 0.8 to 10 bars.

4. The process as claimed in claim 1, wherein the walls of the combustion chamber arranged to form a cooling system are comprised of a plurality of vertically disposed tubular structures which are welded together.

5. The process as claimed in claim 1, wherein the superheated steam is used for operating turbines of the kind employed for the generation of current.

6. A process for making phosphorus pentoxide by subjecting elemental yellow phosphorus to combustion with dried air inside a stainless steel-made combustion chamber with utilization of the reaction heat for the production of energy, which comprises: effecting the combustion with the resultant formation of hot gaseous phosphorus pentoxide inside a combustion chamber of which the walls are arranged so as to form a cooling system with cavities therein; circulating water or a water/steam-mixture as a heat carrier abstracting the reaction heat through the cooling system, the water or water/steam-mixture assuming a temperature of 100° to 370° C. under a pressure of 1 to 220 bars; continuously taking from the cooling system steam which is being formed therein; introducing an equivalent proportion of fully desalted fresh water containing 0.01 to 0.1 mg/l oxygen and 0.01 to 0.5 mg/l chloride into the cooling system; using said hot gaseous phosphorus pentoxide issuing from the combustion chamber with a temperature of 500° to 1000° C. for preheating, in heat exchange, to 70° to 300° C. the dried air necessary for the combustion of the phosphorus, furthermore using said hot gaseous phosphorus pentoxide for preheating, in heat exchange, said fully desalted fresh water provided for introducing into the cooling system to 50° to 200° C., and finally condensing said hot gaseous phosphorus pentoxide or working it up into phosphoric acid; flowing the steam taken from the cooling system through a steam delivery pipe disposed in the delivery conduit for said hot gaseous phosphorus pentoxide and therefore being in contact with said hot gaseous phosphorus pentoxide, heating the steam in said steam delivery pipe to a temperature of 400° to 600° C. under constant pressure, with the resultant formation of superheated steam, and ultimately using the steam so superheated.

7. The process as claimed in claim 6, wherein the hot phosphoric acid obtained upon quenching the issuing gaseous phosphorus pentoxide with phosphoric acid is used for preheating, in heat exchange, fully desalted fresh water to 40° to 80° C., the cooling water so preheated being circulated through the cooling system of the combustion chamber.

8. The process as claimed in claim 6, wherein the phosphorus is subjected to combustion under a pressure of 0.8 to 10 bars.

9. The process as claimed in claim 6, wherein the walls of the combustion chamber arranged to form a cooling system are comprised of a plurality of vertically disposed tubular structures which are welded together.

10. The process as claimed in claim 6, wherein the superheated steam is used for operating turbines of the kind employed for the generation of current.

* * * * *